United States Patent [19]

Jones et al.

[11] Patent Number: 4,676,586

[45] Date of Patent: Jun. 30, 1987

[54] APPARATUS AND METHOD FOR PERFORMING LASER MATERIAL PROCESSING THROUGH A FIBER OPTIC

[75] Inventors: Marshall G. Jones, Scotia; Gregory Georgalas, Schenectady, both of N.Y.

[73] Assignee: General Electric Company, Schenectady, N.Y.

[21] Appl. No.: 714,660

[22] Filed: Mar. 21, 1985

Related U.S. Application Data

[63] Continuation of Ser. No. 450,951, Dec. 20, 1982, abandoned.

[51] Int. Cl.⁴ .......................... G02B 6/36; G02B 6/26; B23K 9/00
[52] U.S. Cl. .................... 350/96.20; 350/96.15; 350/96.29; 350/96.30; 350/96.33; 219/121 L; 219/121 LC; 219/121 LD; 219/121 LM; 219/121 LG; 219/121 LJ; 219/121 LK
[58] Field of Search ............... 350/96.10, 96.15, 96.20, 350/96.18, 96.21, 96.29, 96.30, 96.33; 372/4, 6, 40; 219/121 L, 121 LB, 121 LA, 121 LC, 121 LD, 121 LE, 121 LF, 121 LG, 121 LJ, 121 LK, 121 LN, 121 LR, 121 LU, 121 LY, 121 LM

[56] References Cited

U.S. PATENT DOCUMENTS

| | | | |
|---|---|---|---|
| 3,382,343 | 5/1968 | Muncheryan | 350/96.18 |
| 3,404,350 | 10/1968 | Muncheryan | 219/121 LA |
| 3,622,743 | 11/1971 | Muncheryan | 219/121 LB |
| 3,843,865 | 10/1974 | Nath | 219/121 L |
| 3,920,980 | 11/1975 | Nath | 219/121 L |
| 4,167,328 | 9/1979 | Cross et al. | 350/96.18 |
| 4,170,997 | 10/1979 | Pinnow et al. | 350/96.26 |
| 4,305,640 | 12/1981 | Cullis et al. | 350/96.10 |
| 4,311,142 | 1/1982 | Machida | 219/121 LB |
| 4,354,736 | 10/1982 | Maklad et al. | 350/96.30 X |
| 4,380,365 | 4/1983 | Gross | 350/96.20 |
| 4,398,790 | 8/1983 | Righini et al. | 350/96.18 |
| 4,443,684 | 4/1984 | Sakuragi et al. | 219/121 LB |
| 4,521,070 | 6/1985 | Sottini et al. | 350/96.15 |
| 4,564,736 | 1/1986 | Jones et al. | 219/121 L |

FOREIGN PATENT DOCUMENTS

| | | |
|---|---|---|
| 3202218 | 8/1982 | Fed. Rep. of Germany . |
| 55-153327 | 11/1980 | Japan ...................... 219/121 L |
| 57-92133 | 6/1982 | Japan . |

OTHER PUBLICATIONS

Driscoll et al., "Handbook of Optics" McGraw-Hill Co., 1978, pp. 13-4 and 13-5.
Cocito et al., "COS2 Experiment in Turin . . . " IEEE Trans. on Comm., vol. Com-26, No. 7, Jul. 1978, pp. 1028-1035.
Nath, "Hand Held Laser Welding . . . Optics", Optics and Laser Technology 10/74, vol. 6, No. 5, pp. 233-235.
Allan, "Lasers in the Factory", *IEEE Spectrum* 5/79, pp. 42-49.

*Primary Examiner*—William L. Sikes
*Assistant Examiner*—Brian M. Healy
*Attorney, Agent, or Firm*—Donald R. Campbell; James C. Davis, Jr.; Paul R. Webb, II

[57] ABSTRACT

Pulse laser energy in the near infrared and visible spectrum is passed through a single fiber optic at power levels required for material and metal processing. A neodymium-YAG laser used in pulsed mode is coupled to the end of a quartz fiber optic which transmits peak powers in the kilowatt range. In order to transmit higher amounts of average power, a prepared fiber end allows beam coupling through core-air and core-cladding zones. The beam at the output of the fiber optic is focused to achieve power densities capable of cutting, drilling, and welding of metals etc. The main advantage is greater flexibility of laser beam manipulation.

6 Claims, 3 Drawing Figures

APPARATUS AND METHOD FOR PERFORMING LASER MATERIAL PROCESSING THROUGH A FIBER OPTIC

This application is a continuation of application Ser. No. 450,951 filed 12-20-82 now abandoned.

BACKGROUND OF THE INVENTION

This invention relates to a laser beam delivery method and system and more particularly to transmission of laser energy through a fiber optic at power levels high enough for manufacturing purposes.

Typically, laser beam delivery for material processing is accomplished through the use of an ensemble of mirrors and prisms for beam steering. An increase in beam steering flexibility is possible when a laser beam is passed through a fiber optic. This flexibility enhances the access to difficult locations on a workpiece during manufacture. Such material processing as drilling, cutting, welding, and selective heat treating and laser surfacing is possible with the laser remote from the workstation.

Laser energy has been transferred along a fiber optic for the purpose of laser communications and laser surgery in the medical field. In both cases, the laser beam is a continuous wave (CW) and average power levels of 100 watts have not been exceeded. As much as 20 watts of CW power from a $CO_2$ laser, which has a 10.6 micrometer wavelength in the far infrared, have been transmitted through a fiber optic. The 100 watt CW power level was achieved from a laser that has a 1.06 micrometer wavelength in the near infrared. Only the $CO_2$ laser has been used with a fiber optic for material processing with applications such as engraving and cloth cutting. The average or peak powers are not sufficient for welding, cutting, drilling, and heat treating metals at cost effective rates. The $CO_2$ laser fiber optic which is composed of thallous bromide and thallous iodide is capable of 55 percent transmittance at 10.6 micrometers, and because of this level of transmissivity requires cooling. The neodymium-yttrium aluminum garnet laser, a source of 1.06 micrometer wavelength energy, has provided the 100 watt CW average power for surgical applications. Such power levels are adequate for limited metal processing but have not been applied. Peak powers in excess of 1000 watts would be more desirable for metal processing.

SUMMARY OF THE INVENTION

Laser energy is coupled into a single fiber optic which is used as a lightguide to deliver sufficient pulse energy to a workpiece for material processing. A laser beam generated by a solid state neodymium-YAG laser or other laser which is operated in pulsed mode and has a wavelength in the near infrared and visible spectrum, is focused onto one end of the fiber optic core, preferably made of quartz. Energy with a peak power in the kilowatt range is passed through the fiber to the output end. The emerging laser beam is focused onto the workpiece at a power density high enough for manufacturing processes such as drilling, cutting, welding, heat treating, and laser surfacing.

The system has a lens that focuses the laser's beam to a small spot whose diameter is less than the fiber core diameter; the numerical aperture is such that the included angle of the focused beam is less than about 24°. In a specific embodiment, coupling takes place through a holding fixture made of copper or gold which reflects laser energy and prevents stray energy from entering the fiber optic cladding and melting it. The cladding at the fiber end is removed and the fiber is received in a hole in the fixture. A second embodiment for average power levels up to 250 watts has another input coupler. The fiber end is stripped of cladding and shielding and only the shielding is removed in the next section to allow beam coupling through core-air and core-cladding zones, and the prepared fiber end is mounted in a glass holder. At the output is a lens system to recollimate and refocus the laser beam onto the workpiece.

This is a flexible laser beam delivery system with minimum optical losses, and increases the degrees of freedom of laser beam manipulation. It is especially attractive for metal processing with robotic control.

DETAILED DESCRIPTION OF THE INVENTION

Metal processing and the processing of other materials is accomplished by the laser energy delivery system in the figures. Average power levels on the order of 250 watts and peak powers of several kilowatts have been transmitted through an individual fiber optic. A neodymium-yttrium aluminum garnet laser, which has a wavelength in the near-infrared, is operated in pulsed mode. Other suitable solid state lasers are the ruby laser with a wavelength of 680 nanometers, and the alexandrite laser with a wavelength of 630–730 nanometers, both in the visible spectrum. All the near infrared and visible wavelengths are transmitted in a quartz fiber optic without melting the quartz. This kind of fiber optic is preferred because the fiber is flexible and quartz can be drawn into long fibers and is a pure material; impurities tend to absorb energy. The system includes provision for coupling the laser energy into the fiber and focusing the beam leaving the fiber to a power density sufficient for material processing.

Figure 1:
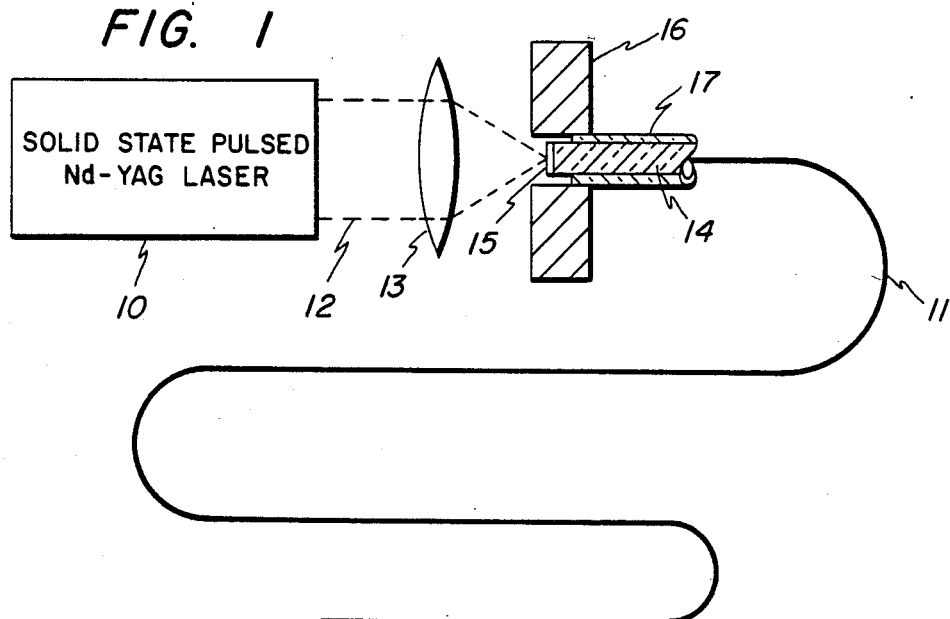
FIG. 1 is a diagram of the laser coupled fiber optic system used to apply laser energy to a metal workpiece.
Figure 1:
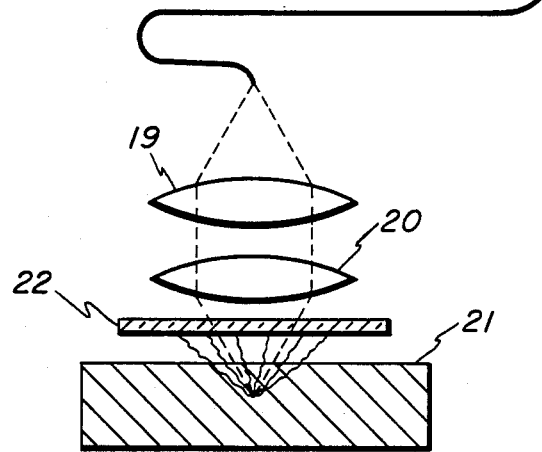

In FIG. 1, a Nd-YAG laser 10 being used in a pulsed mode is coupled to a 1000 micrometer diameter fused quartz fiber optic 11 by focusing the laser beam 12 down on the end of the fiber with a lens 13. In order for the laser energy to enter the fiber, two conditions are needed. First, the small spot at the focal plane has a diameter less than the diameter of quartz core 14. Second, the numerical aperture of the fiber optic is such that the included angle of the focused beam (like a cone angle) is smaller than 22°–24°. For best results the end of core 14 is ground optically flat and has an antireflection coating 15. Coupling takes place through a holding fixture 16 made of copper which has a hole to receive the fiber 11. About one-fourth inch of the transparent silicon cladding 17 is removed from the end of the fiber. The copper fixture 16 helps to protect the fiber cladding from any stray laser energy that does not enter the end of the fiber, and prevents melting of the cladding. Copper tends to reflect 1.06 micrometer laser energy at moderate power levels. A better material would be gold, a higher reflective material.

Figure 2:
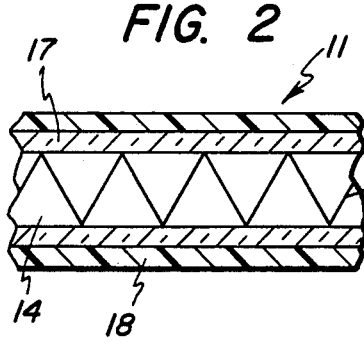
FIG. 2 is a longitudinal cross section through the fiber optic and shows passage of the laser beam along the core.

Referring to the cross section of fiber optic 11 in FIG. 2, the laser beam travels along quartz core 14 in a zig-zag path and is reflected at the interface with silicon cladding 17. The optical fiber has a nylon shielding or jacket 18. If a fused quartz fiber optic with a glass cladding is used, the flexibility of the fiber would be decreased but the power carrying capability may increase, since the 1.06 micrometer wavelength is transparent to glass, thus leading to lower risk in potential cladding damage. The fiber has a diameter less than 1 millimeter; fibers larger than this are less flexible.

Having transmitted laser energy through the fiber optic 11 a lens assembly 19, 20 is used to collimate and focus the laser beam. The emerging beam at the output end of the fiber optic tends to spread out. The beam is recollimated by lens 19 and refocused by lens 20 onto the metal workpiece 21. The power density of the focused beam at the focal plane is sufficient for various metal processes. The laser beam may be passed through a glass plate 22 to protect the lenses from any metal vapor. An antireflection coating on the three lens elements increases the transmissivity.

Average power levels up to 155 watts were transmitted into the fiber. With a pulse width (pulse length) of 0.6 milliseconds and a pulse rate of 30 pulses per second, a peak power range of 4000-6000 watts was achieved. After focusing this beam at the output of the fiber optic, power densities of $10^6$-$10^7$ watts/cm$^2$, capable of drilling and cutting, were achieved. The 155 watts of laser pulse energy were transmitted through a 1 millimeter fiber optic without any detectable attenuation with bend radii greater than 8 inches (200 millimeters). With fiber bend radii of 1.5 inches (37.5 millimeters), transmittance at 1.06 micrometers is 87 percent. The laser beam output from the fiber optic was focused on a 0.30 inch (0.75 millimeters) thick Inconel 718 workpiece resulting in both drilling and cutting the material.

The diameter of output lens 19, 20 may be much smaller than illustrated, resulting in an output end that is much easier to move around. The end of the fiber may be ground to be a lens element or part of a lens, or a separate element may be attached to the fiber.

Figure 3:
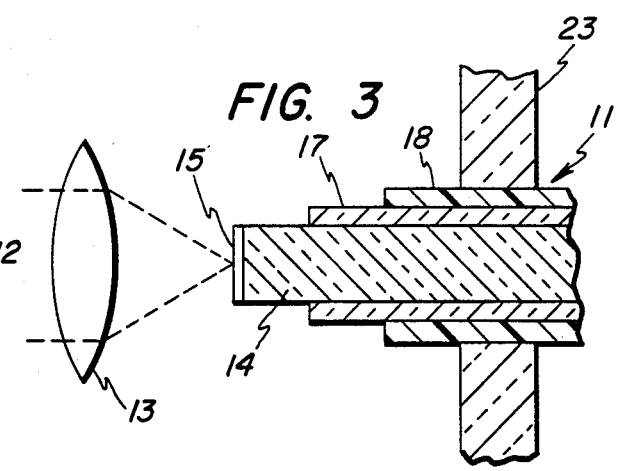
FIG. 3 shows an improved input mechanism to transmit higher amounts of average power into the fiber optic.

The input mechanism in FIG. 1 allows only up to 155 watts of average laser energy, not enough for all processing tasks; higher powers are prohibited due to thermal limitations at the input coupling. Up to 250 watts of average power were transmitted into the fiber optic with the improved coupler in FIG. 3. The fiber tip is stripped of silicon cladding 17 and shielding 18 for 0.75 inches. In the next section just the shielding is removed for an equal distance. This prepared end is then placed in a Pyrex ® holder 23 and set at the proper focal plane of the laser. The prepared end allows beam coupling through two zones, core-air and core-cladding. The first region permits the highly divergent incident beam to enter the fiber 11 through a greater acceptance angle provided by the core-air interface. The second zone will provide additional reflections to insure transmission of the collected light energy. The third zone of core, cladding and shielding provide a rugged housing for fiber handling.

Average power levels up to 250 watts were transmitted into a fiber of approximately five meters in length. With a pulse width of 0.2 millisecond and a pulse rate of 200 pulses per second, a peak power range of 5000-9000 watts was achieved. After focusing the beam at the output of the fiber optic, power densities ($10^6$-$10^7$ watts/cm$^2$) capable of drilling and cutting were achieved.

Up to 250 watts of Nd-YAG laser pulse energy can be transmitted through a 1 millimeter fiber optic without detectable attenuation with fiber bend radii greater than 4 inches (100 millimeters). At the 4 inch radii, transmittance at 1.06 micrometers is 90 percent. A 0.060 inch (154 millimeter) thick titanium 6Al-4V workpiece was both drilled and cut. With the ability to transmit the higher amounts of average power the system is much more versatile to the materials processing industry.

The main advantage of the fiber optic laser delivery system is an increase in beam steering flexibility. The degrees of freedom of laser beam manipulation are increased. With the fiber optic basically light in weight, the laser beam is moved in almost any direction at a rapid speed. Being able to locate the laser remotely from the workstation is an additional advantage of transmitting a laser beam through a lightguide such as a fiber optic. The flexibility inherent in a fiber optic laser beam delivery system also makes it very attractive for laser material processing with robotic control.

While the invention has been particularly shown and described with reference to preferred embodiments thereof, it will be understood by those skilled in the art that changes in form and details may be made therein without departing from the spirit and scope of the invention.

The invention claimed is:

1. An improved method of delivering laser energy to perform metal processing comprising:

generating a near infrared or visible wavelength pulsed laser beam;

providing a single fiber optic having a numerical aperture, a quartz core having a diameter less than 1,000 micrometers diameter, a cladding and a protective shielding, said cladding and shielding being removed from one end of said core for a short distance and in a next section only said shield is removed;

focusing said laser beam onto said core end to a small spot whose diameter is less than the core diameter, the numerical aperture being such that said focused beam has an including angle less than 24°;

coupling said beam into said fiber optic through air-core and core-cladding zones and transmitting energy with a peak power in the kilowatt range; and focusing the laser beam emerging from said fiber optic onto a workpiece at a power density sufficient for metal processing.

2. The method of claim 1 wherein average power levels up to 250 watts are transmitted into said fiber optic.

3. An improved industrial laser energy delivery system comprising:

a laser operating in pulsed mode that produces a near infrared or visible wavelength laser beam;

a single fiber optic having a numerical aperture, a quartz core having a known diameter, a cladding and a shielding;

a holder for one prepared end of said fiber optic from which said cladding and shielding are removed and then only said shielding is removed to allow beam coupling through core-air and core-cladding zones;

a lens to focus said laser beam onto one end of said quartz core to a spot diameter smaller than the core diameter, the numerical aperture of said fiber optic being such that the included angle of said focused beam is less than 24°;

said fiber optic serving as a lightguide to transmit peak powers in the kilowatt range to its output end; and a lens system to collimate and focus the laser beam emerging from said fiber optic onto a metal workpiece to perform processes such as cutting, drilling and welding.

4. The system of claim 3 wherein said end of said quartz core is optically flat to enhance coupling of laser energy.

5. The system of claim 4 wherein said laser is a neodymium-YAG, ruby, or alexandrite laser.

6. The system of claim 3 wherein said holder is made of glass.

* * * * *